United States Patent [19]

Tick

[11] 4,379,070
[45] Apr. 5, 1983

[54] TIN-PHOSPHORUS OXYFLUORIDE GLASS CONTAINING AROMATIC ORGANIC COMPOUND

[75] Inventor: Paul A. Tick, Corning, N.Y.

[73] Assignee: Corning Glass Works, Corning, N.Y.

[21] Appl. No.: 371,791

[22] Filed: Apr. 26, 1982

[51] Int. Cl.$^3$ .................................................. C09K 11/06
[52] U.S. Cl. .......................... 252/301.16; 252/301.18; 252/301.33; 252/301.4 P; 350/345; 350/354; 350/357; 430/139; 430/945; 501/13; 501/32; 501/44
[58] Field of Search ............... 252/301.16, 301.18, 252/301.33, 301.4 P; 501/44, 13, 32; 350/354, 357; 430/945

[56] References Cited

U.S. PATENT DOCUMENTS

| | | | |
|---|---|---|---|
| 3,352,058 | 11/1967 | Brant | 47/58 |
| 3,635,544 | 1/1972 | Stamm et al. | 350/354 |
| 4,217,391 | 8/1980 | Kaltz | 350/354 |
| 4,314,031 | 2/1982 | Sanford et al. | 501/44 |

OTHER PUBLICATIONS

Kasha, M., "Fabrication of Boric Acid Glasses for Luminescence Studies", Jour. Opt. Soc. Am., 38 (12), pp. 1068–1073, Dec. 1948.
Schoot, C. J. et al., "New Electrochromic Memory Display", Appl. Phys. Lett. 23 (2), pp. 64–65, Jul. 1973.
Weyl, W. A., COLOURED GLASSES, pub. by Soc. of Glass Technology, England, 1967 edition, pp. 464–465.

Primary Examiner—Helen M. McCarthy
Attorney, Agent, or Firm—Kees van der Sterre

[57] ABSTRACT

A tin-phosphorous oxyfluoride glass in the Sn—P—O—F composition field is used as a supporting matrix for light-responsive polycyclic aromatic hydrocarbons, such as triplet state or lasing dyes. Dye compatibility with the glass is good, as evidenced by the fact that glasses containing the dyes exhibit luminescence characteristic of the dissolved dye in a rigid solvent.

8 Claims, 6 Drawing Figures

LUMINESCENCE
----- 2,3 BENZANTRACENE IN CHCL$_3$
—— BENZANTRACENE IN GLASS
-·—·— GLASS ALONE

TIN-PHOSPHORUS OXYFLUORIDE GLASS CONTAINING AROMATIC ORGANIC COMPOUND

BACKGROUND OF THE INVENTION

The present invention relates to solid inorganic glasses containing hydrocarbon compounds, and is based on the discovery of a family of hybrid (organic/inorganic) glasses wherein significant amounts of certain polycylic aromatic hydrocarbon compounds can be successfully dissolved in the glass.

The class of polycyclic or polynuclear aromatic hydrocarbons includes a number of compounds exhibiting photophysical responses to light. Such responses include lasing, luminescence (phosphorescence and fluorescence), and also triplet state absorption. These so-called photosensitive compounds may contain as few as fourteen carbon atoms (eg. phenanthrene $C_{14}H_{10}$) or up to nearly fifty carbon atoms (eg. rubrene $C_{42}H_{28}$).

Compounds of this class include the well known triplet state compounds or triplet state dyes. Triplet state compounds have been dispersed in plastic matrix materials to provide light-responsive products such as photochromic plastics. U.S. Pat. No. 3,635,544 discloses photochromic plastics containing triplet state aromatic hydrocarbons.

Light-responsive combinations comprising a polymeric matrix and a dissolved polycyclic hydrocarbon such as a triplet state dye compound offer rapid darkening in response to actinic radiation and rapid relaxation in the absence thereof. However, plastic polymer matrix materials typically exhibit only limited hardness and in addition are permeable to oxygen and other constituents which can adversely affect the photophysical response characteristics of the triplet state compound dissolved therein.

The use of a glassy matrix to study luminescence in triplet state compounds is proposed by M. Kasha, Jour. Opt. Soc. Am. 38 (12) pages 1068-73 (December 1948). Kasha employed a boric acid glass, but notes that other easily-fusible glassy materials such as aluminum sulfate, sugars, boroglycerides, mixtures of sodium borate and sodium metaphosphate, and mixtures of silicates and phosphates, might be suitable. While such glassy materials offer the advantage of reduced oxygen permeability, their chemical durability is low. Thus they have been employed only as vehicles for study, rather than as practical media for supporting the photophysical characteristics of dissolved hydrocarbons.

Another group of photosensitive polycyclic aromatic hydrocarbons or dye compounds exhibiting light responsive characteristics are the so-called laser dyes. As noted by J. M. Kauffman in *Applied Optics*, 19 (20) 3431-3435 (October 1980) many polycyclic aromatic hydrocarbons are known to exhibit lasing responses when stimulated with light under appropriate conditions.

Yet another group of aromatic dye compounds has been identified wherein the compounds exhibit changes in light absorption in response to the application of an electric field, ie., an electrochromic response. These field-responsive compounds are exemplified by the so-called viologens, which are typically 4-4'-dipyridinium derivatives (C. J. Schoot et al., *Appl. Phys. Lett.* 23 [2] 64-65 [July 1973]).

In the case of the lasing and electrochromic dyes, host materials have generally been limited to plastics, or to organic or aqueous solvents. Thus practical applications utilizing the light- or electric-field-responsive characteristics of these hydrocarbons have been somewhat limited.

It is therefore a principal object of the present invention to provide novel combinations of polycyclic aromatic hydrocarbon compounds and glass wherein the glass provides a matrix of improved durability and utility.

It is a further object of the invention to provide a hybrid or composite organic/glass material wherein the photophysical response characteristics of dissolved organic compounds can be usefully exploited.

Other objects and advantages of the invention will become apparent from the following description.

SUMMARY OF THE INVENTION

The present invention is founded on the discovery that certain tin phosphorous oxyfluoride glasses constitute a useful glass matrix material for the support of photosensitive and electric-field-responsive polycyclic aromatic hydrocarbons such as above described. Hence, the solubility of these hydrocarbons in the selected glasses is sufficiently large to permit the incorporation of at least an effective amount of organic material, and the chemistry of the glass is such that at least some photophysical response characteristics of the photosensitive compounds are substantially preserved. By effective amount is meant an amount which imparts detectable light or electric-field responsive characteristics to the glass.

Tin-phosphorous oxyfluoride glasses suitable for use as a supporting medium for photosensitive polycyclic aromatic compounds in accordance with the invention may be selected from among those known in the art. These glasses comprise, in weight percent on an elemental basis as calculated from the batch, about 20-85% Sn, about 2-20% P, 3-20% O, 10-36% F, and at least 75% total of $Sn+P+O+F$. Glasses within this composition range exhibit low glass transition temperatures, frequently in the region of 100° C. or below, yet offer remarkable resistance to attack by moisture at elevated temperatures, notwithstanding the very low softening temperatures thereof.

Glass articles containing up to about 1% by weight of at least one polycyclic aromatic hydrocarbon compound in accordance with the invention can be prepared by providing a tin-phosphorous oxyfluoride glass in molten form, mixing the selected aromatic compound or compounds into the molten glass, and forming the molten glass with dispersed organic constituents into an article of the desired configuration. Upon cooling, the glass with its included organic constituents exhibits response characteristics essentially analogous to those exhibited by the compounds when dissolved in organic solutions or plastics, but with some modifications depending upon the composition of the hydrocarbon selected for use and the nature of the glass matrix in which the compounds are suspended.

BRIEF DESCRIPTION OF THE DRAWINGS

The invention may be further understood by reference to the drawings wherein:

FIG. 6 demonstrates the luminescence of a lasing dye introduced into a glass matrix in accordance with the invention.

DETAILED DESCRIPTION

Figure 1:
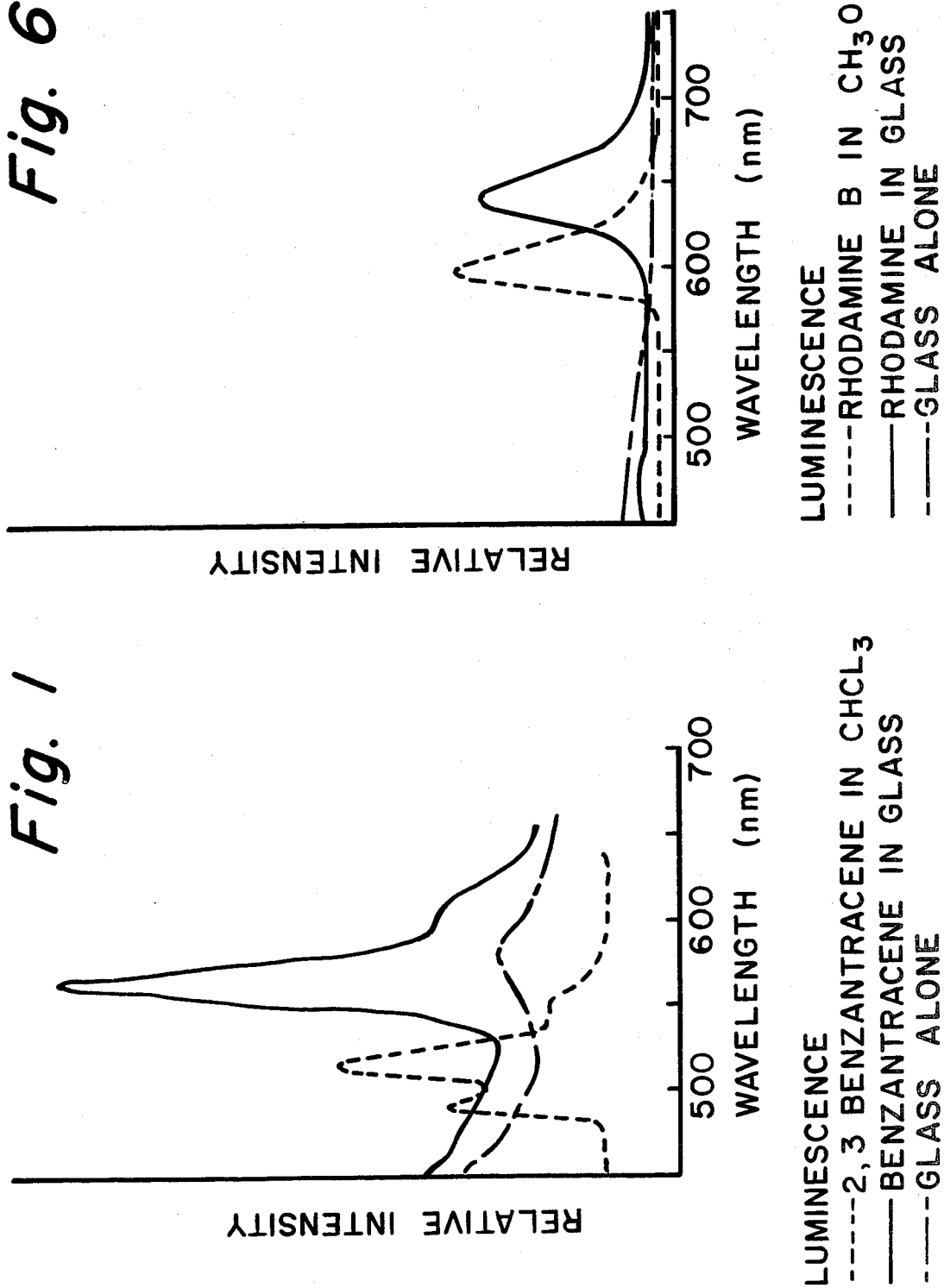
FIG. 1 shows the luminescence of a particular polycyclic aromatic hydrocarbon (2, 3 benzanthracene) as it is manifested in a chloroform solvent and in a glass matrix in accordance with the invention.

Composition research on tin-phosphorous oxyfluoride glasses has been reported in U.S. Patent 4,314,031. As disclosed in that patent, these glasses can be made from conventional batch materials such as $SnF_3$, $P_2O_5$, $Sn_3(PO_4)_2$, SnO, $NH_4H_2PO_4$, $NH_4PF_6$ and $Sn_2P_2O_7$, and can be melted at temperatures not exceeding 600° C. (typically in the 400°–450° C. range) to provide homogeneous glasses of good quality and relatively high chemical durability.

As also noted in that patent, the tin-phosphorous oxyfluoride glass system may include a variety of additional optional constituents including alkali metals, alkaline earth metals, group II metals such as zinc and cadmium, group III elements such as La, Ce, B and Al, group IV elements such as Pb, Zr, Ti, Si and Ge, group V elements such as Sb and Nb, group VI elements such as Mo and W, group VII elements such as Cl, Br and I, and group VIII metals such as Fe and Gd. Reference may be made to that patent for a further description of glass compositions in the tin-phosphorous oxyfluoride composition system, all of which are believed suitable for use in the present invention.

Glasses suitable for producing articles containing photosensitive organic compounds can be prepared from commercial grade batch chemicals, melted in any suitable melting unit, eg., a nickel, silica or vitreous carbon crucible, and formed by pressing, casting, blowing, molding or the like. Because of the low melting temperatures of these glasses, Teflon ® fluorocarbon plastic crucibles may also be used.

Table I below reports examples of specific glass compositions which may be used to produce products in accordance with the invention. Included in Table I are batch compositions, reported in parts by weight of compounds utilized to make up the batch, and also glass compositions resulting from the melting of the reported batches, in parts by weight on an elemental basis.

TABLE I

| | Glass Compositions | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Batch Composition | | | | | | | | | | | | | | | |
| $SnF_2$ | 15.3 | 12.2 | 10.2 | 87 | 126 | 125 | 142 | | 6.4 | 18.8 | 17.6 | 122 | 86 | 72 | 55 | 47 |
| $NH_4H_2PO_4$ | 8.8 | 5.4 | 5.4 | 54 | 62 | 48 | | | 6.7 | 5.4 | 5.3 | 54 | | | |
| $ZnF_2$ | 1.6 | | | | | | | | | | | | | | |
| $PbF_2$ | | 2.2 | 2.2 | 22 | | | | | 0.5 | 7.0 | | 22 | | | |
| SnO | | | 1.7 | 30 | | | | | 6.3 | 3.8 | | | | | |
| $Pb(PO_2)_2$ | | | | | | | 41 | | | | | | | | |
| $Sn_2P_2O_7$ | | | | | | | 46 | | | | | | 39 | | 10 |
| $SnCl_2$ | | | | | | | | | 1.7 | | | | | | |
| $BaF_2$ | | | | | | | | | | 2.6 | | | | | |
| $P_2O_5$ | | | | | | | | | | | | 25 | 11 | 31 | 43 |
| $NH_4PF_6$ | | | | | | | | | | | | 16 | | 34 | |
| Glass Composition | | | | | | | | | | | | | | | |
| Sn | 51.0 | 50.4 | 51.2 | 52.1 | 56.7 | 59.8 | 57.1 | 60 | 50.2 | 55.2 | 51.7 | 52.4 | 62.9 | 36.8 | 41.5 |
| Pb | | 10.8 | 11.0 | 11.1 | | | 10.6 | 2.1 | 20.4 | | 10.9 | | | | |
| P | 10.7 | 8.3 | 8.5 | 8.6 | 10.3 | 8.4 | 6.1 | 10.2 | 4.2 | 6.1 | 8.2 | 11.2 | 8.9 | 12.5 | 20.2 |
| Zn | 4.3 | | | | | | | | | | | | | | |
| Ba | | | | | | | | | | 8.9 | | | | | |
| F | 20.8 | 20.8 | 18.2 | 15.6 | 20.9 | 22.1 | 16.9 | 10.3 | 17.9 | 23.2 | 18.6 | 25.6 | 14.3 | 32.6 | 11.2 |
| Cl | | | | | | | | | 1.6 | | | | | | |
| O | 13.1 | 9.7 | 11.1 | 12.5 | 12.1 | 9.7 | 9.3 | 7.6 | 5.8 | 6.6 | 10.6 | 10.8 | 14.1 | 13.8 | 26.9 |

Small glass batches of the above compositions, having a batch weight of about 20 grams, may be melted in nickel crucibles at 450° C. in a small electric furnace, a melting interval of 15 minutes normally being sufficient to provide clear, bubble-free melts. Typically, the melts will then be slightly cooled, for example by transfer to a furnace operating at a somewhat lower temperature (e.g., about 300° C.) to facilitate the introduction of the organic constituents.

The introduction of one or more photosensitive organic constituents into such glasses may be accomplished by simply adding the compounds to the melt and then swirling to obtain a uniform dispersion. Preferably, the melt with added organic compounds is allowed to homogenize for about 5 minutes at the mixing temperature, and thereafter formed, for example, by casting onto a steel plate or into a TEFLON ® plastic-lined mold.

The temperature at which the organic constituents are added may of course be varied depending upon the boiling and decomposition temperatures of the organic compound selected for use. It is preferred to introduce these compounds into the glass at a temperature at least 30 and preferably 100° C. below the temperature at which the compound will boil or decompose.

The selection of a polycyclic aromatic hydrocarbon compound or compounds for incorporation into the glass will of course depend upon the photophysical response characteristics desired in the product. However, it is believed that essentially any polycyclic aromatic hydrocarbon belonging to the classes of photosensitive or electrochromic dye compounds above described which can be heated to at least 250° C. without boiling or decomposition could be used. For the purpose of the present description, a photosensitive polycyclic aromatic hydrocarbon compound can be a laser dye or a compound exhibiting luminescence and/or triplet-state absorption of light on exposure to actinic radiation, i.e., ultraviolet or short wavelength visible light. U.S. Pat. No. 3,635,544 gives many examples of compounds of the latter type, and others are known. For a further description of the phenomena of luminescence and triplet-state absorption in polycyclic aromatic compounds, reference may be made to "Photophysics of Aromatic Molecules", Birks, Wiley Interscience, New York (1972).

Representative examples of triplet-state polycyclic aromatic hydrocarbons which may be incorporated in tin-phosphorous oxyfluoride glass in accordance with the invention are set forth in Table II below. Included in the Table are an identification of each compound, the empirical formula for the compound, and the melting and boiling points for each compound where known.

TABLE II

| Photosensitive Aromatic Hydrocarbons | | | |
|---|---|---|---|
| Compound | Empirical Formula | MP, °C. | BP, °C. |
| phenanthrene | $C_{14}H_{10}$ | 95–98 | 336 |
| chrysene | $C_{18}H_{12}$ | 250–253 | 448 |
| pyrene | $C_{16}H_{10}$ | 149–151 | — |
| perylene | $C_{20}H_{12}$ | 277–279 | 503 |
| 2,3 benzanthracene | $C_{18}H_{12}$ | 300 | — |
| triphenylene | $C_{18}H_{12}$ | 195–198 | 438 |
| p-quarterphenyl | $C_{24}H_{18}$ | 317 | 428 |
| 1,2,3,4 dibenzanthracene | $C_{22}H_{14}$ | 205–207 | 518 |
| 1,2,5,6 dibenzanthracene | $C_{22}H_{14}$ | 266–267 | 524 |
| benzo (a) pyrene | $C_{20}H_{12}$ | 178–179 | 495 |
| benzo (e) pyrene | $C_{20}H_{12}$ | 175–177 | — |
| benzo (ghi) perylene | $C_{22}H_{12}$ | 277 | >500 |
| coronene | $C_{24}H_{12}$ | >360 | 525 |
| rubrene | $C_{42}H_{28}$ | >315 | — |
| 1,2,7,8 dibenzanthracene | $C_{22}H_{14}$ | — | — |

To demonstrate the solubility of these photosensitive organic compounds in glasses of the kind described, small samples of each compound, approximating about 30 milligrams in weight, may be mixed into 20 gram batches of a molten glass having a composition selected from those reported in Table I above, mixing being carried out at a temperature at least about 30° below the boiling or decomposition temperature of the organic compound. Each mixture is allowed to equilibrate for about five minutes and is then cast into a small patty on a steel plate. After cooling, each sample is illuminated with ultraviolet light and the level and color of the induced luminescence are qualitatively recorded.

Table III below records the results of such tests where the presence of luminescence in the sample may be positively observed, indicating successful incorporation of the organic compound therein. These results are for a case where the glass matrix has a composition corresponding to the composition of glass 2 in TABLE I above.

TABLE III

| Luminescence of Aromatics in Glass | |
|---|---|
| Compound | Activated Color |
| phenanthrene | None |
| chrysene | Bright yellow-green |
| pyrene | Bright orange |
| perylene | Bright green |
| 2,3 benzanthracene | Bright yellow |
| triphenylene | None |
| p-quarterphenyl | Weak green |
| 1,2,3,4 dibenzanthracene | Bright yellow |
| 1,2,5,6 dibenzanthracene | Bright yellow-orange |
| 1,2,7,8 dibenzanthracene | Bright green |
| benzo (a) pyrene | None |
| benzo (e) pyrene | Bright yellow-green |

TABLE III-continued

| Luminescence of Aromatics in Glass | |
|---|---|
| Compound | Activated Color |
| benzo (ghi) perylene | Weak orange |
| coronene | Bright yellow |
| rubrene | Weak green |

Some compounds do not exhibit significant luminescence when dissolved in this particular base glass. This may be due to interference by the glass with the photophysical processes involved, the glass itself being slightly fluorescent, or it may be due to limited solubility of these particular compounds in this glass.

It is possible to leach some of these luminescent compounds from the glass using weak aqueous HCL solutions, to then extract the compounds from the aqueous solution with chloroform, and finally to observe fluorescence in the undamaged compounds in chloroform. Even in the case of triphenylene, which did not exhibit strong luminescence in the glass, the extracted compound in chloroform exhibited luminescence corresponding to that of a chloroform solution of unprocessed triphenylene, indicating that the compound had been successfully dissolved in the glass and was not damaged by the process of incorporation.

It is possible to obtain more detailed information about the spectral distribution of luminescence in these hybrid glasses using conventional spectrofluorometric procedures. For this purpose, samples such as above described are mounted in an Aminco-Bowman Spectrofluorometer and the intensity of light emitted from the fluorescing sample is measured as a function of wavelength across the visible spectrum as the sample is being irradiated with ultraviolet light. Such an evaluation may be conducted both on a glass containing the dissolved organic compound and on a solution consisting of the compound dissolved in an organic solvent such as chloroform.

A preferred fluorometric procedure is first to excite the sample with an ultraviolet source to find the visible wavelength at which a maximum in the luminescence spectrum of the compound occurs, then to vary the wavelength of the ultraviolet source until luminescence at this visible wavelength is most intense, and finally to plot the intensity of luminescence across the entire visible spectrum while exciting the sample at this ultraviolet wavelength.

FIG. 1 of the drawing is a plot of typical spectroluminescence data in the visible range for the compound 2, 3 benzanthracene, wherein the visible emission for the compound in glass and in a chloroform solution are shown. The glass alone also exhibits some fluorescence, and the luminescence due to this effect is also plotted. The exciting $\mu v$ radiation wavelengths used to generate the three curves were as follows: 240 nm for the glass alone, 350 nm for 2,3 benzanthracene in glass, and 400 nm for 2,3 benzanthracene in chloroform.

Figure 2:
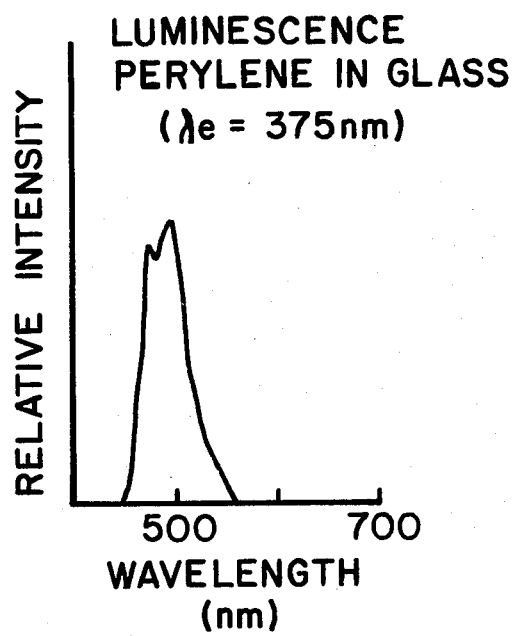
FIGS. 2-4 show the luminescence of three additional polycyclic aromatic hydrocarbons in glass matrices.
Figure 3:
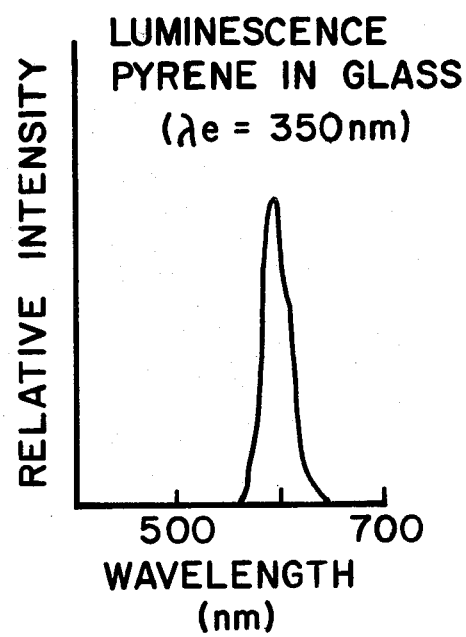
Figure 4:
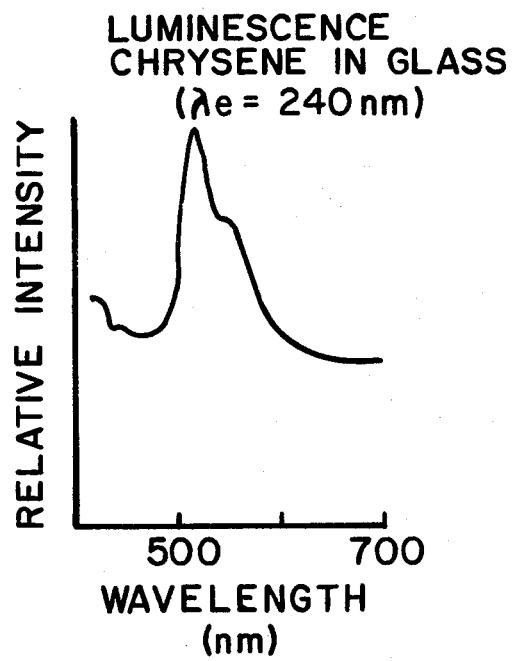

Luminescence data for other selected photosensitive organic compounds in glass are reported in FIGS. 2, 3 and 4 of the drawings. These data include emission spectra for perylene (FIG. 2), pyrene (FIG. 3) and chrysene (FIG. 4). The figures show the spectral distribution of luminescence for the compound dissolved in the glass, and also report the $\mu v$ wavelength, $\mu_e$ at which the glass was excited to generate the spectral data.

The fact that several of the listed compounds exhibit good luminescence in glass but not in a chloroform extract from the glass as previously discussed has not been satisfactorily explained. It is difficult to analyze the glass for these compounds because their concentrations are at the lower limit of sensitivity for conventional techniques (about 0.1%). However, even at this concentration the molarity of these compounds in the glass matrix is of the order of $10^{-3}$, which compares very favorably with the concentration limits in plastic matrix materials such as polymethylmethacrylate or epoxy. It is expected that significantly greater amounts of these hydrocarbons, perhaps up to 1% or more, could be dissolved in selected Sn-P-O-F glasses, but this would not necessarily lead to an enhancement of the photophysical response characteristic observed, because of the known concentration dependence of these characteristics.

As is well known, the luminescence exhibited by polycyclic aromatic hydrocarbon compounds of the kind described above is generally the product of both phosphorescent and fluorescent emissions. Both fluorescence and phosphorescence result from radiation emitted by excited electrons in the molecules as the electrons decay to the ground state ($S_o$); however fluorescence is a short-lived effect resulting when an electron returns from an excited singlet state S to the ground state, typically having a duration not exceeding about $10^{-8}$ seconds from the time of excitation. Phosphorescence, on the other hand, is caused by the decay of an excited electron from a triplet state $T_1$ to the ground state, and the effect is typically of much greater duration, on the order of seconds or milliseconds from the time of excitation.

Figure 5:
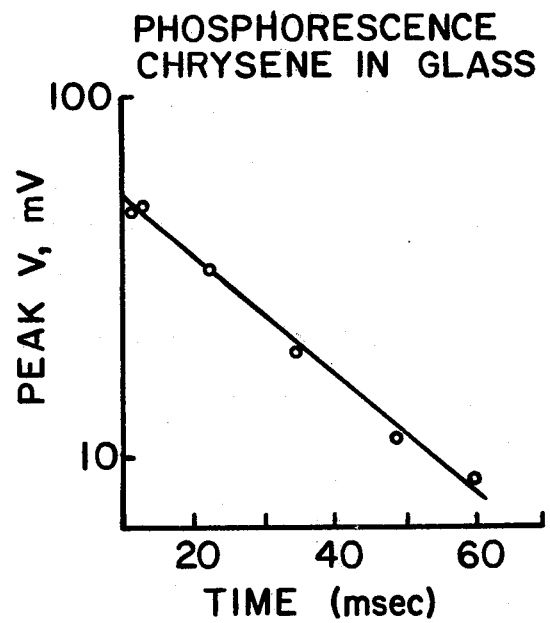
FIG. 5 illustrates the phosphorescence of two products containing polycyclic aromatic hydrocarbon compounds in accordance with the invention.

Phosphorescence in glass articles containing polycyclic aromatic compounds in accordance with the invention can be detected with a phosphorscope attachment to the spectrofluorometer above described, this attachment being designed to detect the decay of luminescence with time following the excitation of the sample with ultraviolet light. The intensity of residual emission (phosphorescence) from the sample is measured as a function of time from the last excitation, intensity being measured with a photomultiplier tube having an electrical output which is proportional to the intensity of the impinging light. The typical form of data generated in this manner is shown in FIG. 5 of the drawing, which plots output from the photocell, in millivolts, as a function of time following excitation of a glass sample containing chrysene as reported in Tables II and III above. From these data it can be seen that the duration of the phosphorescent effect in this sample is of the order of milliseconds.

Phosphorescence data for other polycyclic aromatic hydrocarbons in glass as reported in Table III above are reported below in Table IV. Included in Table IV are the ultraviolet excitation wavelengths of maximum excitation for each sample, the emission wavelengths at which phosphorescence by the samples is maximized, and the duration of phosphorescence $t_p$ for each sample in milliseconds as determined at 25° C. Because the excitation and emission wavelengths of the dissolved compounds listed in Table IV are all similar, the phosphorescence life time values $t_p$ were generated using a single excitation wavelength of 350 nm and a single emission wavelength of 510 nm for all of the glasses.

TABLE IV

| Phosphorescence of Aromatics in Glass | | | |
|---|---|---|---|
| Compound | Peak Excitation (nm) | Peak Emission (nm) | $t_p$ (msec) |
| 1,2,3,4 dibenzanthracene | 345 | 570 | 99 |
| 1,2,3,6 dibenzanthracene | 350 | 560 | 89 |
| 1,2,7,8 dibenzanthracene | 345 | 510 | 60 |
| coronene | 345 | 495 | 119 |
| perylene | 375 | 500 | 90 |
| 2,3 benzanthracene | 350 | 560 | 118 |
| pyrene | 350 | 590 | 50 |
| chrysene | 240 | 520 | 48 |
| deuterated chrysene | 340 | 520 | 68 |

Triplet state absorption in polycyclic aromatic compounds depends upon the lifetime of excited electrons in the triplet state, i.e., the average time interval between excitation and decay to the ground state, since it is only the excited-state electrons which absorb light in the visible range. Triplet state lifetime depends on several factors, including the nature of the medium in which the compound is suspended and the presence or absence of constituents which can quench the phosphorescence, e.g., dissolved oxygen. In the glasses utilized in the present invention, it appears that the stability of triplet state electrons is intermediate between their stability in a liquid solvent (about 1 msec.) and in a polymeric matrix (about 1 sec.). This lifetime is short enough so that the glasses do not exhibit significant triplet state absorption (photochromism) under normal ambient lighting conditions.

Investigations have indicated that triplet state lifetimes do not vary significantly as a function of glass composition in the tin-phosphorous oxyfluoride system. Likewise, variations in crucible composition and in melting conditions cause little change, although with some photosensitive compounds phosphorescence can be enhanced by soaking the compound in the molten glass attemperatures near the melting temperature (e.g., 400° C.) for a period of 4–12 hours before forming and cooling the glass.

Some lifetime enhancement is also obtained by deuteration of the aromatic compound prior to use, a fact which is known and has been exploited in polymer matrix materials. Thus, deuterated chrysene has a phosphorescence lifetime significantly longer than that of chrysene in the same base glass, indicating that the lifetime of excited electrons in the triplet state is longer in the deuterated compound. In the case of a sample containing deuterated dibenzocoronene which had been soaked at 400° C. for 12 hours after incorporating the compound into the glass melt, a phosphorescence lifetime of 535 ms was exhibited. As a consequence of this extended lifetime, the glass demonstrated some photochromic darkening upon exposure to krypton laser light.

An example of a laser dye successfully incorporated in a tin-phosphorus oxyfluoride glass is a polycyclic aromatic compound known as Rhodamine B ($C_{28}H_{31}ClN_2O_3$), also known as C.I. Basic Violet 10 or, alternatively, C.I. Food Red 15 (Chem. Abst. Reg. No. 81-88-9). This compound has an untuned laser output wavelength maximum at 610 nm in ethanol.

FIG. 6 of the drawing compares the emission of this compound in an ethanol solvent with its emission in a glass having a composition corresponding to that of glass 1 in Table I, when excited by ultraviolet light (375 nm). The peak emission wavelength in glass is about 640 nm.

An example of an electrochromic dye which has been dissolved in a tin-phosphorus oxyfluoride glass is the viologen known as N'N diheptyl-4,4'bipyridinium dibromide. A glass containing this compound exhibited darkening in an electric field, although some of this darkening was attributed to a change in the transmittance of the glass itself.

Because of the good compatibility of tin-phosphorus oxyfluoride glasses with organic compounds it is feasible to dissolve still other aromatic, alicyclic or aliphatic compounds in these glasses provided the compound can be heated to at least 250° C. without boiling or decomposition. Hence compounds such as triphenyl carbenium hexafluorophosphate, zinc phthalocyanine, 1,4 diphenyl-1,3 butadiene, phthalocyanine and bis(triphenyl) tin oxide can be incorporated in these glasses to give homogeneous glass articles in which the photophysical properties, such as luminescence, or the mechanical/physical properties, such as refractive index, hardness or glass transition temperature, are modified. Thus the examples hereinabove set forth are merely illustrative of articles which could be provided in accordance with the invention within the scope of the appended claims.

I claim:

1. A tin-phosphorous oxyfluoride glass article containing at least one dissolved polycyclic aromatic hydrocarbon which exhibits a response to light or an electric field, the compound being present in a concentration ranging up to about 1% by weight of the glass.

2. A glass article in accordance with claim 1 having a composition which comprises, exclusive of the polycyclic aromatic hydrocarbon compound, about 20–85% Sn, 2–20% P, 3–20% O, 10–36% F, and at least 75% total of Sn+P+O+F.

3. A glass article in accordance with claim 2 wherein the polycyclic aromatic hydrocarbon compound contains 14–42 carbon atoms, has boiling and decomposition temperatures above 250° C., and exhibits a photophysical response to light.

4. A glass article in accordance with claim 3 which includes at least one triplet-state dye compound and which exhibits phosphorescence or fluorescence upon exposure to ultraviolet light.

5. A glass article in accordance with claim 3 which includes at least one triplet-state dye compound exhibiting triplet-state absorption of visible light.

6. A glass article in accordance with claim 3 which includes at least one laser dye.

7. A glass article in accordance with claim 2 which includes at least one electrochromic dye.

8. A glass article in accordance with claim 7 wherein the dye is a viologen dye.

* * * * *